US008800706B2

(12) United States Patent
Deckard et al.

(10) Patent No.: US 8,800,706 B2
(45) Date of Patent: Aug. 12, 2014

(54) FLOORBOARD FOR A VEHICLE

(75) Inventors: Aaron David Deckard, Lindstrom, MN (US); Jeffrey Lynn Gardner, Lindstrom, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 12/218,572

(22) Filed: Jul. 16, 2008

(65) Prior Publication Data

US 2010/0012412 A1 Jan. 21, 2010

(51) Int. Cl.
*B62D 25/20* (2006.01)

(52) U.S. Cl.
USPC .................. 180/90.6; 296/75; 296/193.07

(58) Field of Classification Search
USPC .............. 180/90.6; 296/75, 193.07; 74/564
See application file for complete search history.

(56) References Cited

U.S. PATENT DOCUMENTS

| | | | | |
|---|---|---|---|---|
| 1,162,959 A * | 12/1915 | West | ................................ | 74/564 |
| 2,062,114 A * | 11/1936 | Bashara | ........................ | 74/564 |
| 2,136,980 A * | 11/1938 | Pim | ................................ | 74/564 |
| 2,761,329 A * | 9/1956 | Reed | .............................. | 74/564 |
| 3,047,088 A * | 7/1962 | Murrell | ....................... | 180/90.6 |
| 3,275,094 A * | 9/1966 | Kennedy | ....................... | 180/90.6 |
| 3,424,265 A * | 1/1969 | Stata | ............................ | 180/90.6 |
| 3,426,615 A * | 2/1969 | Strauss | ........................... | 74/513 |
| 4,726,438 A * | 2/1988 | Stuertz et al. | ................ | 180/90.6 |
| 4,991,900 A * | 2/1991 | White | ............................ | 296/75 |
| 5,201,245 A * | 4/1993 | Naruse | ........................... | 74/564 |
| 5,893,424 A * | 4/1999 | Hisada | ........................ | 180/90.6 |
| 6,102,466 A * | 8/2000 | Kanazawa et al. | ............. | 296/75 |
| 6,131,485 A * | 10/2000 | Raja | ............................. | 74/562 |
| 6,179,079 B1* | 1/2001 | Basnett | ........................ | 180/90.6 |
| 7,246,837 B2* | 7/2007 | Dendo et al. | .................... | 296/75 |
| 7,422,082 B2* | 9/2008 | Reffitt | ......................... | 180/90.6 |
| 7,656,385 B2* | 2/2010 | Arche et al. | ................... | 345/156 |
| 7,695,056 B2* | 4/2010 | Hanson et al. | ................ | 296/204 |
| 7,938,481 B2* | 5/2011 | Kobayashi et al. | ........... | 296/204 |
| 7,946,641 B2* | 5/2011 | Ohtsubo et al. | ................. | 296/75 |
| 2004/0195018 A1 | 10/2004 | Inui et al. | | |
| 2007/0176456 A1* | 8/2007 | Ohtsubo et al. | ................. | 296/75 |
| 2007/0205626 A1* | 9/2007 | Ohtsubo et al. | ................. | 296/75 |

FOREIGN PATENT DOCUMENTS

| | | |
|---|---|---|
| DE | 40 30 766 A1 | 4/1991 |
| EP | 0 410 939 A | 1/1991 |
| EP | 1 816 056 A | 8/2007 |
| JP | 04 129885 A | 4/1992 |

* cited by examiner

*Primary Examiner* — Paul N Dickson
*Assistant Examiner* — Robert A Coker
(74) *Attorney, Agent, or Firm* — Faegre Baker Daniels LLP

(57) ABSTRACT

A utility vehicle is disclosed having foot controlled pedals to operate the speed and acceleration of the vehicle. The utility vehicle may include a foot well in the floor board for locating the heel an operator's foot.

27 Claims, 11 Drawing Sheets

FLOORBOARD FOR A VEHICLE

RELATED APPLICATIONS

The subject matter of this application is related to U.S. patent application Ser. Nos. 11/494,890 and 11/494,891 concurrently filed on Jul. 28, 2006; and Ser. Nos. 12/134,909 and 12/135,107, concurrently filed on Jun. 6, 2008, the subject matter of which is incorporated herein by reference.

FIELD OF THE INVENTION

The present invention relates generally to a vehicle and in particular to a utility vehicle having foot controlled pedals.

BACKGROUND AND SUMMARY OF THE INVENTION

Utility vehicles are known. The present disclosure relates to vehicles, including utility vehicles. The present disclosure relates to utility vehicles having foot controlled pedals. The present disclosure relates to a floorboard for use with utility vehicles, and particularly for those with foot controlled pedals.

Present utility vehicles provide a flat floorboard against which a driver may place their heel. The top of the foot then engages the accelerator portion of the foot controls. As the utility vehicle encounters uneven terrain, the driver's foot/heel receives a direct and vertical force, preventing the driver from having a uniform force against the accelerator. Rather, the driver encounters a "jabbing" of the foot against the pedal, which in turn causes jerking movement of the vehicle.

In an exemplary embodiment of the present disclosure, a utility vehicle is provided comprising a vehicle frame, a prime mover attached to the frame, wheels supporting the frame, a floorboard, and a foot control adjacent the floor board, the floorboard having a plurality of contact points for contacting an operator's foot when operating the foot control.

In another embodiment of the disclosure a vehicle comprises a vehicle frame, a prime mover attached to the frame, wheels supporting the frame and driven by the prime mover, a floorboard, and a foot control adjacent the floor board, the floorboard having a recess for receiving the heel of an operator's foot when operating the foot control.

In yet another embodiment of the invention, a vehicle comprises a vehicle frame, a prime mover attached to the frame, wheels supporting the frame and driven by the prime mover, a floorboard, and a plurality of foot controls adjacent the floor board. The floorboard has a groove laterally flanking the plurality of foot controls, the groove being profiled to define a location for the heel of an operator's foot when operating the plurality of foot controls.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

Corresponding reference characters indicate corresponding parts throughout the several views. Unless stated otherwise the drawings are proportional.

DETAILED DESCRIPTION OF THE DRAWINGS

Figure 1:
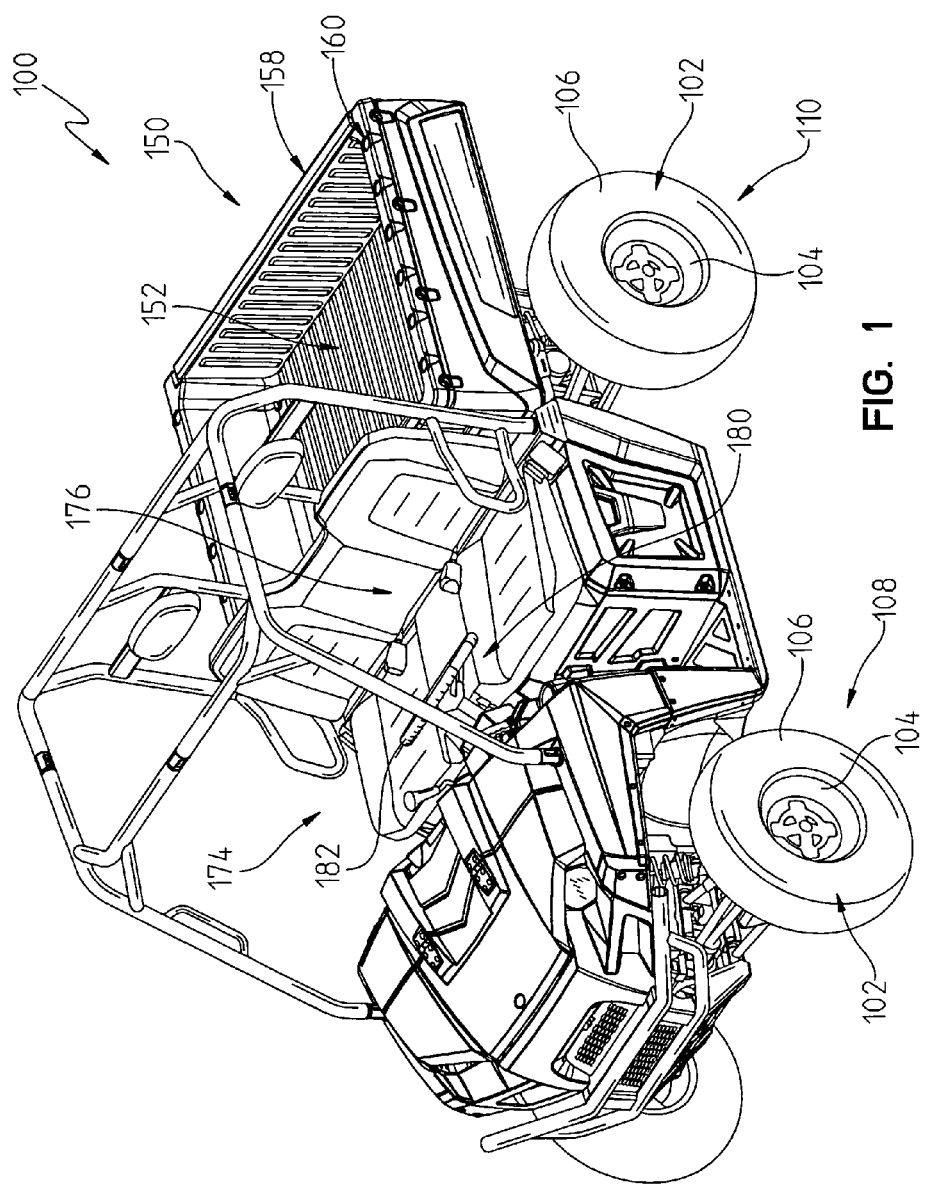
FIG. 1 is a perspective view of an exemplary utility vehicle.

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, and golf carts.

Referring to FIGS. 1-4, an illustrative embodiment of a vehicle 100 is shown. Vehicle 100 as illustrated includes a plurality of ground engaging members 102. Illustratively, ground engaging members 102 are wheels 104 and associated tires 106. Other exemplary ground engaging members include skis and tracks. In one embodiment, one or more of the wheels may be replaced with tracks, such as the Prospector II Tracks available from Polaris Industries, Inc. located at 2100 Highway 55 in Medina, Minn. 55340.

As mentioned herein one or more of the ground engaging members 102 are operatively coupled to a drive train 130 (see FIG. 2) to power the movement of vehicle 100. Exemplary drive trains include prime movers such as combustion engines and electric engines, or a combination thereof, together with a transmission.

Referring to the illustrated embodiment in FIG. 1, a first set of wheels, one on each side of vehicle 100, generally correspond to a front axle 108. A second set of wheels, one on each side of vehicle 100, generally correspond to a rear axle 110. Although each of front axle 108 and rear axle 110 are shown having a single ground engaging member 102 on each side, multiple ground engaging members 102 may be included on each side of the respective front axle 108 and rear axle 110, or may include an optional third and rear axle.

As configured in FIG. 1, vehicle 100 is a four wheel, two axle vehicle having a frame 116 (see FIGS. 2 and 5) of vehicle 100. Frame 116 is supported by the ground engaging members 102 of vehicle 100. The construction of frame 116 may be the same as the corresponding portion of the frame disclosed in U.S. patent application Ser. No. 12/092,153, filed Apr. 30, 2009, and U.S. Provisional Patent Application Ser. No. 60/918,502, filed Mar. 16, 2007, the disclosures of which are expressly incorporated by reference herein. The vehicle could also take on the form of any of the previously filed U.S. patent application Ser. Nos. 11/494,890 and 11/494,891 concurrently filed on Jul. 28, 2006; and Ser. Nos. 12/134,909 and 12/135,107, concurrently filed on Jun. 6, 2008, the subject matter of which is incorporated herein by reference.

Figure 5:
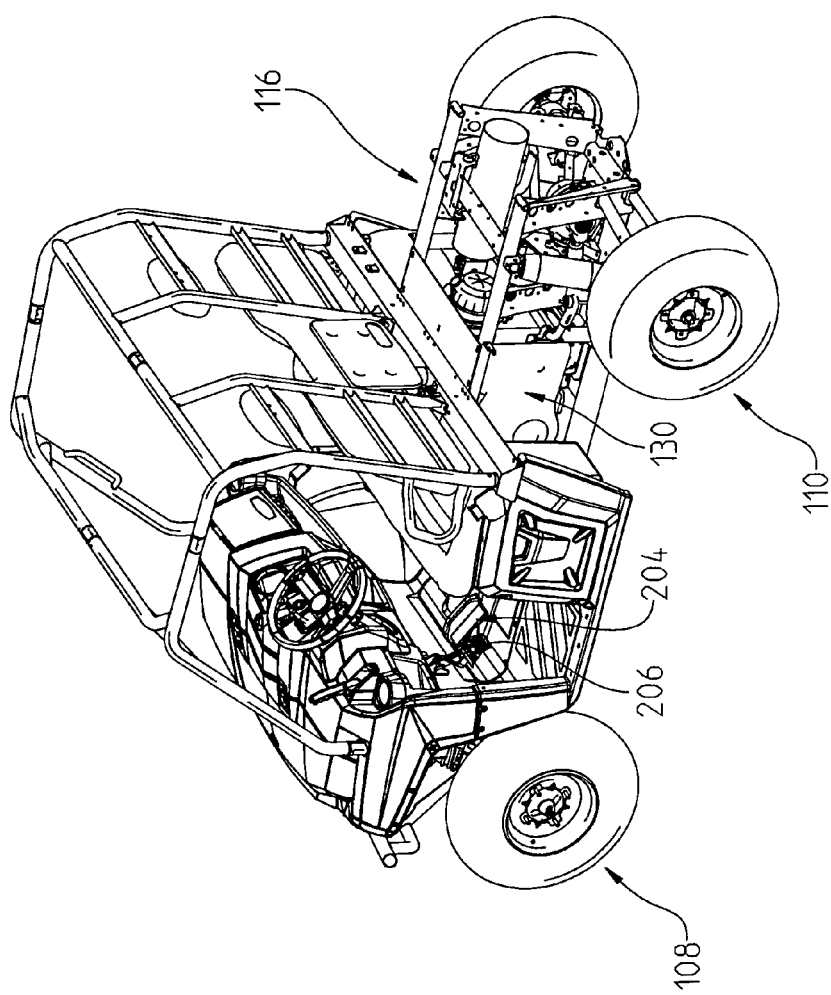
FIG. 5 illustrates a perspective view of the utility vehicle of FIG. 1 with a cargo bed removed.

Turning to FIG. 5, a drive train 130 is supported by frame 116 and may include a combustion engine. In one embodiment, drive train 130 may include a multi-fuel engine capable of utilizing various fuels. An exemplary multifuel engine capable of utilizing various fuels is disclosed in U.S. patent application Ser. No. 11/445,731, filed Jun. 2, 2006, the disclosure of which is expressly incorporated by reference herein. In one embodiment, drive train 130 includes a hybrid electric engine. In one embodiment, drive train 130 includes an electric engine.

Returning again to FIG. 1, vehicle 100 includes a bed 150 having a cargo carrying surface 152. Cargo carrying surface 152 may be flat, contoured, and/or comprised of several sections. In one embodiment, bed 150 is rigidly coupled to frame 116. Bed portion 150 may include a tailgate 158 which may be lowered to improve ingress to and egress from bed 150. Bed 150 further includes a plurality of mounts 160 for receiving an expansion retainer (not shown) which may couple various accessories to bed 150. Additional details of such mounts and expansion retainers are provided in U.S. Pat. No. 7,055,454, to Whiting et al., filed Jul. 13, 2004, titled "Vehicle Expansion Retainers," the disclosure of which is expressly incorporated by reference herein.

As shown in FIG. 1, vehicle 100 includes an operator area 174 generally supported by frame 116. Operator area 174 includes seating 176 for one or more passengers. Operator area 174 further includes a plurality of operator controls 180 by which an operator may provide input into the control of vehicle 100. Controls 180 include a steering wheel 182 which is rotated by the operator to change the orientation of one or more of ground engaging members 102, such as the wheels associated with front axle 108, to steer vehicle 100. In one embodiment, steering wheel 182 changes the orientation of the wheels of front axle 108 and rear axle 110 to provide four wheel steering.

Figure 2:
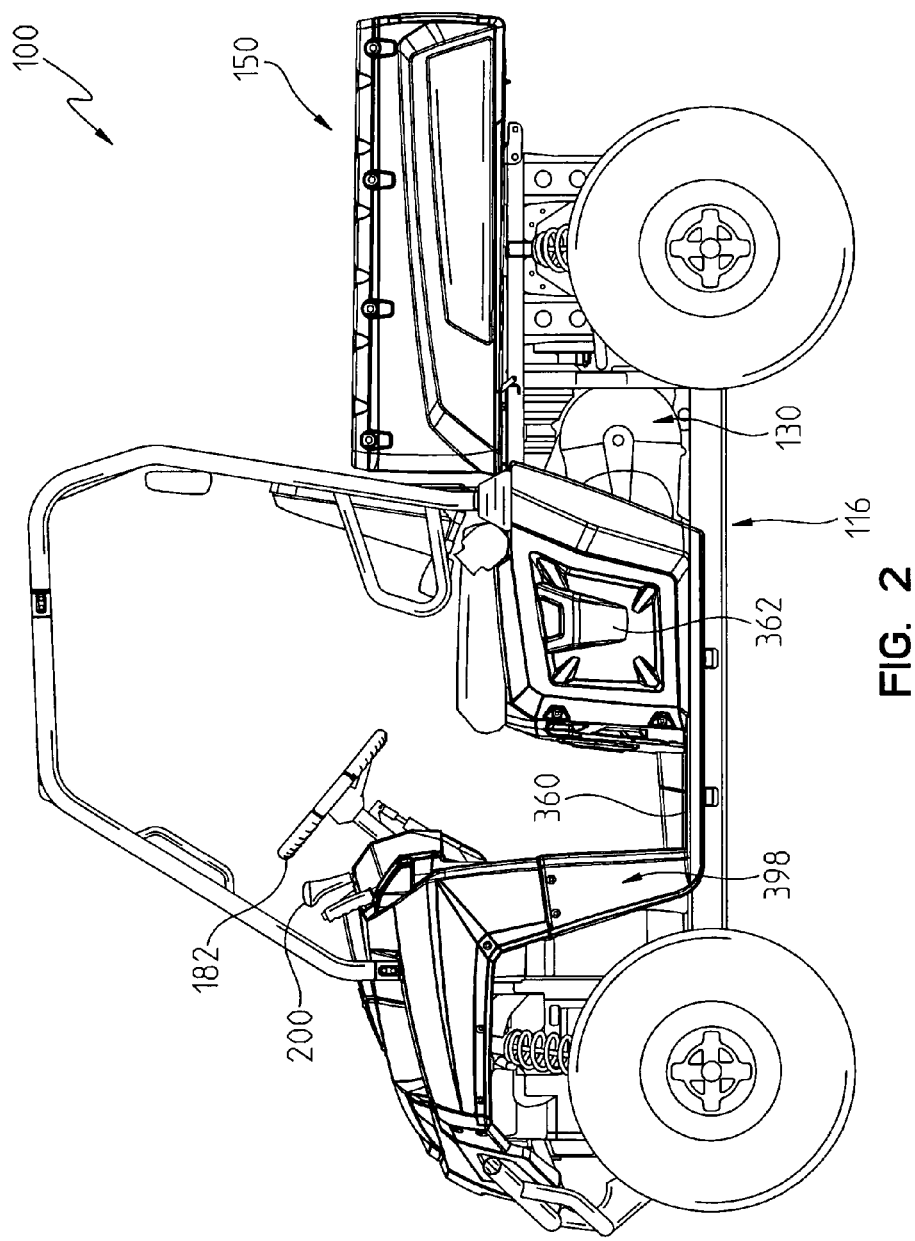
FIG. 2 illustrates a left side view of the exemplary utility vehicle of FIG. 1.
Figure 4:
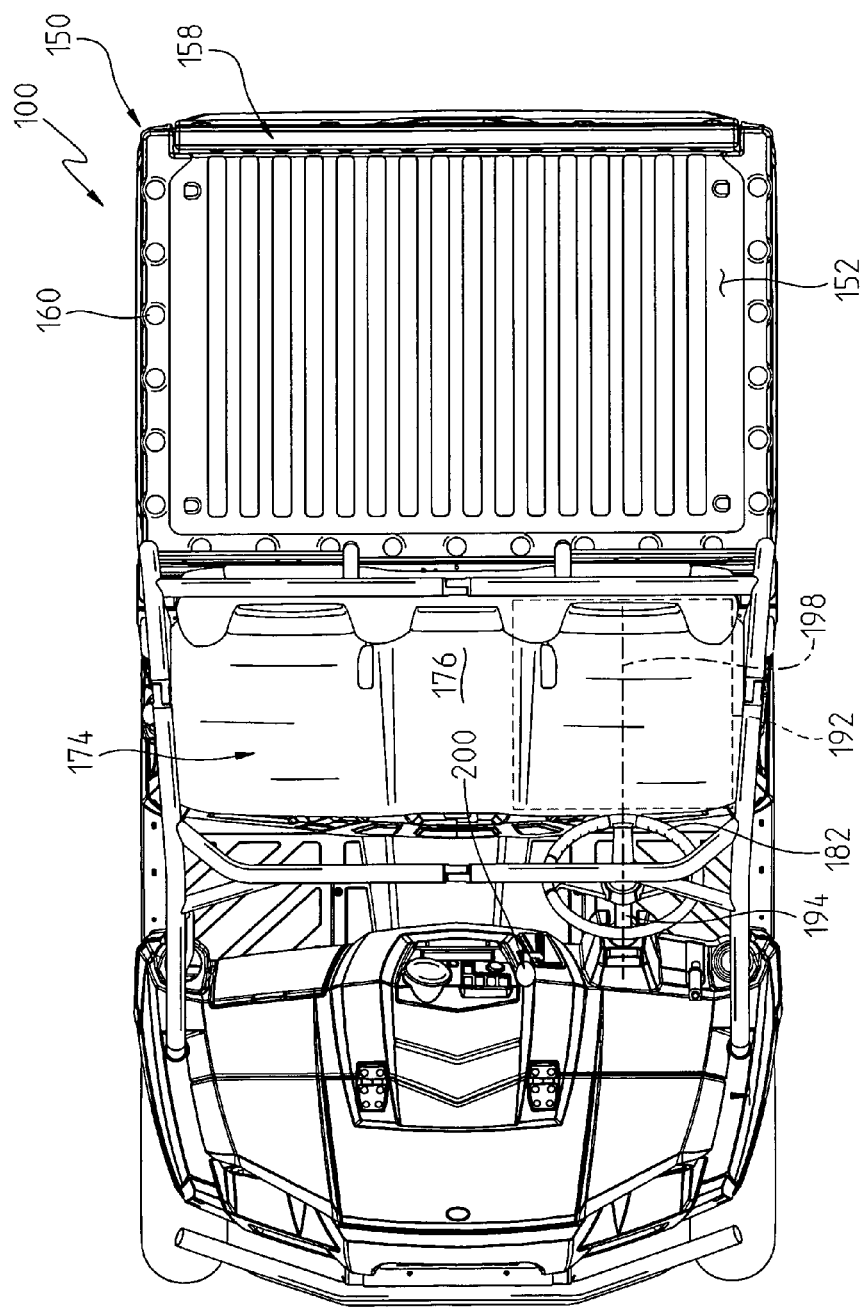
FIG. 4 illustrates a top view of the utility exemplary vehicle of FIG. 1.

Referring to FIG. 4, a vehicle operator position 192 on seating 176 is represented. As shown in FIG. 4, a steering column 194 of steering wheel 182 is laterally centered as indicated by line 198 in the vehicle operator position 192. Also, as shown in FIGS. 2 and 4, a gear shift input control 200 is operatively coupled to a shiftable transmission of drive train 130 to communicate whether the shiftable transmission is in a low forward gear, a high forward gear, a reverse gear, neutral, and if included, a park position. Although, gear shift input control 200 is shown as a lever, other types of inputs may be used. Gear shift input control 200 is positioned on a right hand side of steering column 194.

Figure 3:
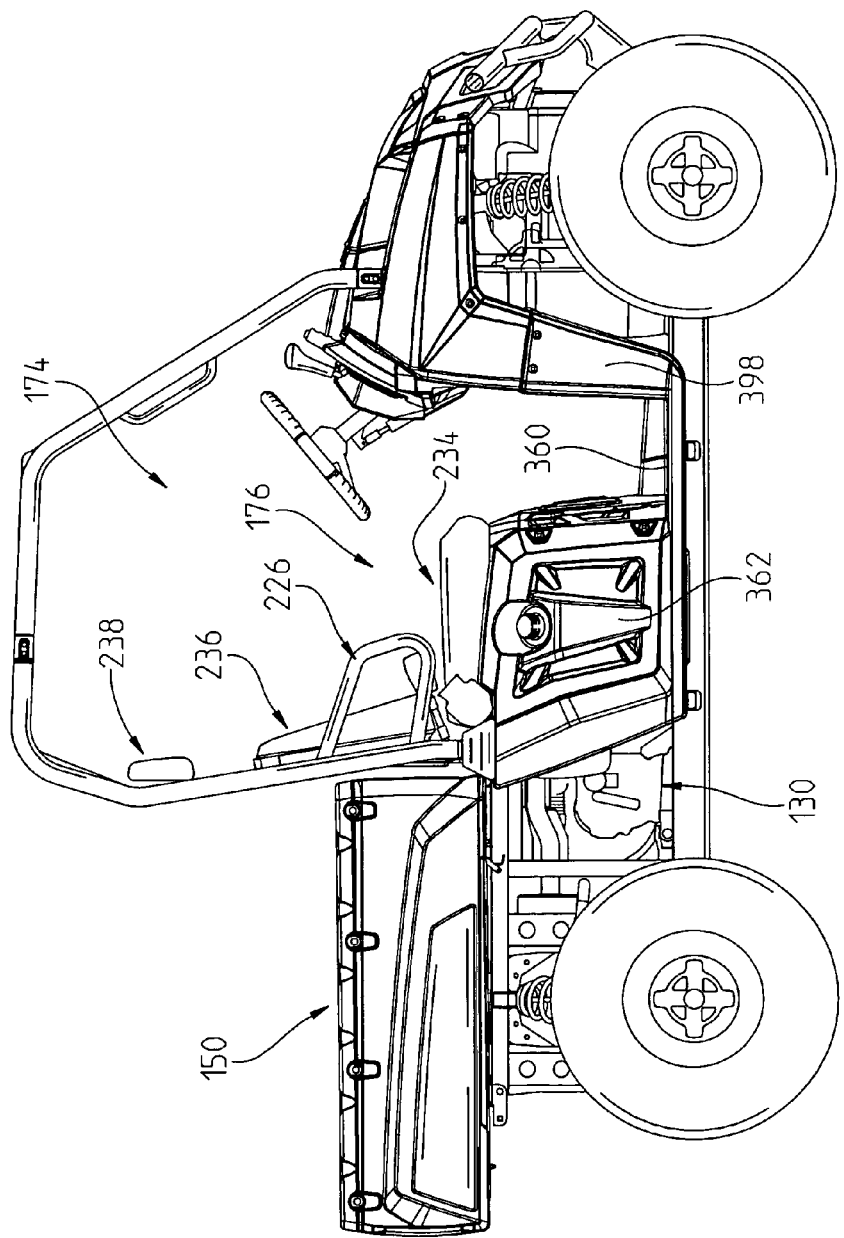
FIG. 3 illustrates a right side view of the exemplary utility vehicle of FIG. 1.
Figure 6:
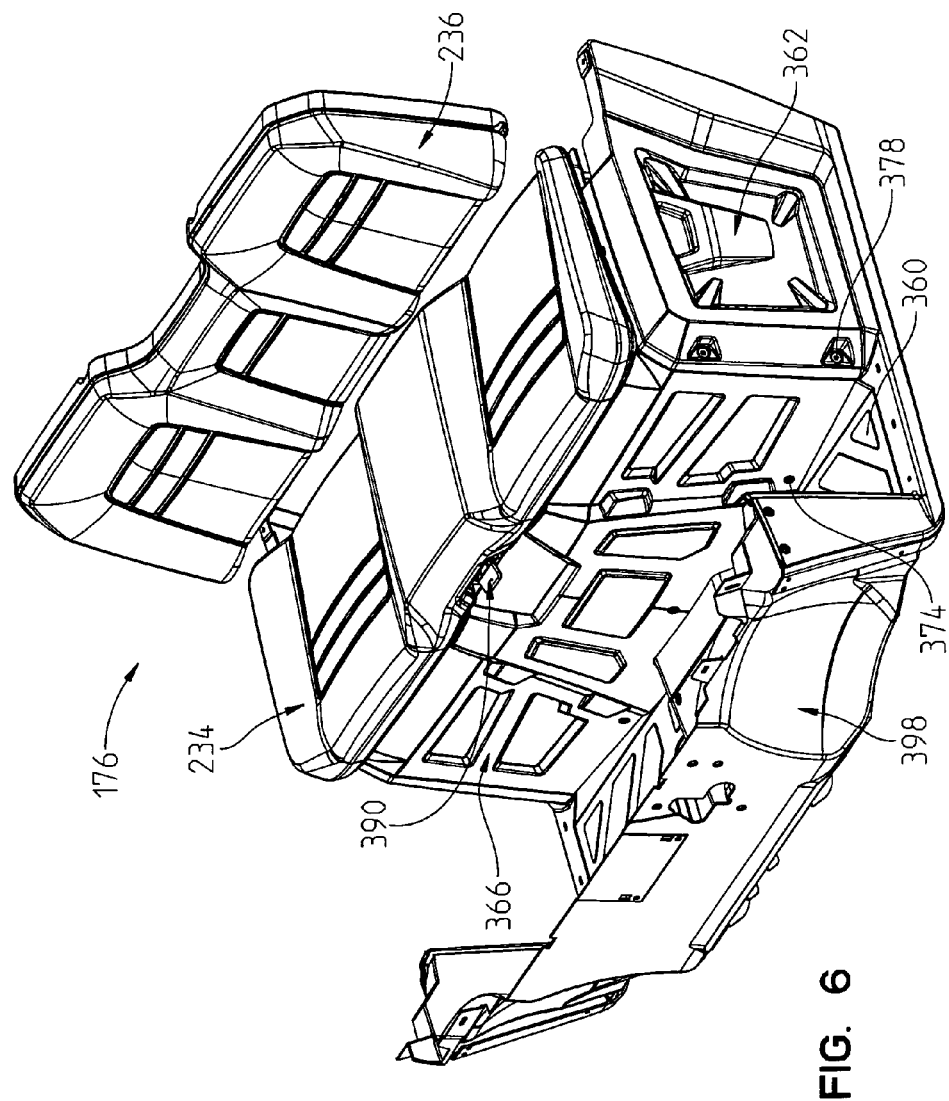
FIG. 6 illustrates a perspective view of the seating and floor body panel.

As shown in FIG. 3, seating 176 includes a seat bottom portion 234 and a seat back portion 236. Seat bottom portion 234 is tilted from horizontal by about 8.5 degrees such that the back edge of the seat bottom (proximate the bed) is lower than the front edge of the seat bottom. Seat back portion 236 is titled towards bed 150 from vertical about 17 degrees. Seating 176 also includes head rests 238. In one embodiment, seating 176 is a split bench with the operator side being adjustable along the longitudinal axis of vehicle 100. Drive train 130 (particularly the engine) may also be accessed by rotating seat bottom portion 234 forward. Referring to FIG. 6, a latch lever 390 is provided that releases the back portion of seat bottom portion 234 allowing the back portion of seat bottom portion 234 to rotate forward.

Figure 7:
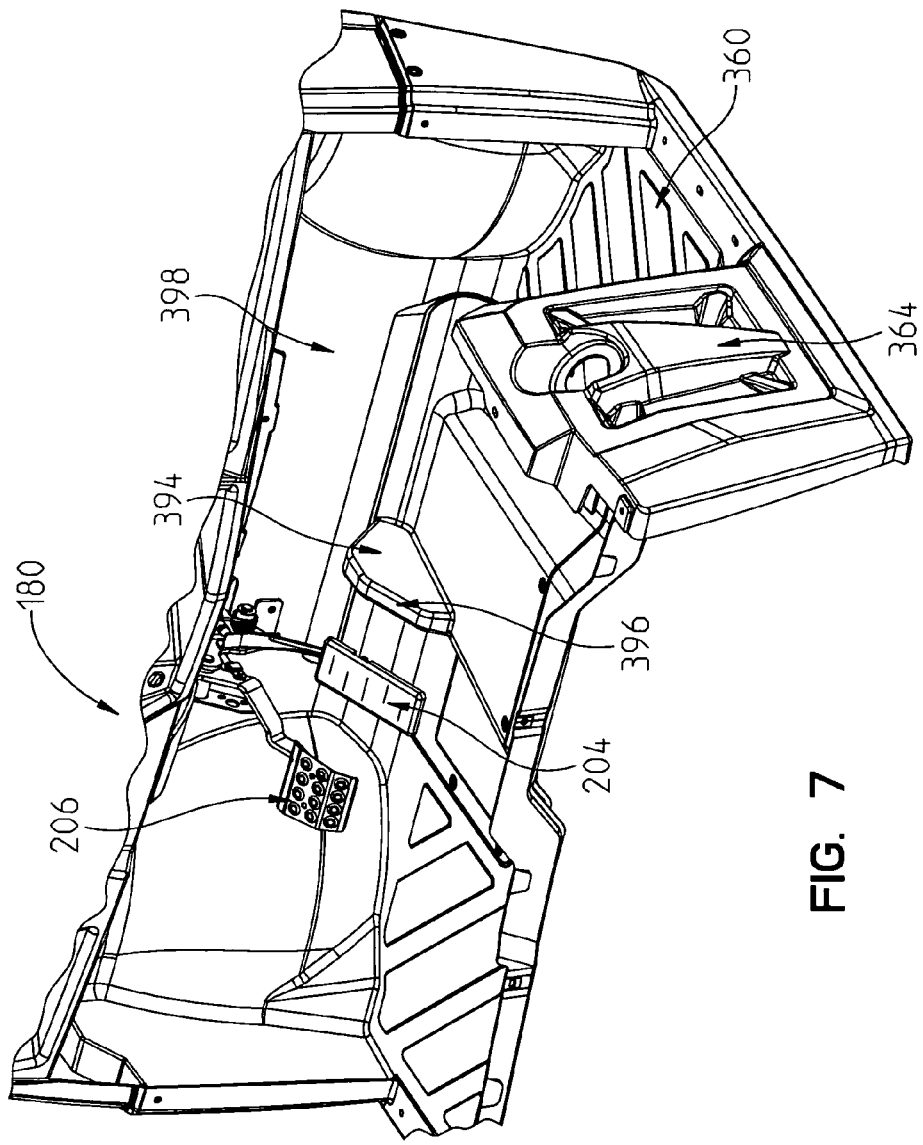
FIG. 7 illustrates a guard member provided as part of the floor body panel.

Referring to FIGS. 5 and 7, controls 180 also include a first foot pedal 204 actuatable by the vehicle operator to control the acceleration and speed of vehicle 100 through the control of drive train 130 and a second foot pedal 206 actuatable by the operator to decelerate vehicle 100 through a braking system. In one embodiment, pedal 206 is offset to the right of steering column 194 such that both of the first foot pedal 204 and the second foot pedal 206 are generally in line with a right foot of an operator.

Referring to FIG. 6, seating 176 is shown in combination with a floor body panel 360, side body panels 362, and a removable under seat body panel 366. Seat body panel 366 is removable to allow access to drive train 130. Seat body panel 366 is further coupled to floor body panel 360 through connectors received in openings 374 in seat body panel 366 and through openings in the floor body panel 360. Seat body panel 366 is further coupled to side body panels 362 through fasteners 378 in seat body panel 366. Seat body panel 366 is removed to permit access to drive train 130 by removing the connectors attaching seat body panel 366 to floor body panel 360, first side body panel 362, and second side body panel 364 and then rotating and lifting seat body panel 366 relative to floor body panel 360 to uncouple retainers 370 from portions 372.

Figure 8:
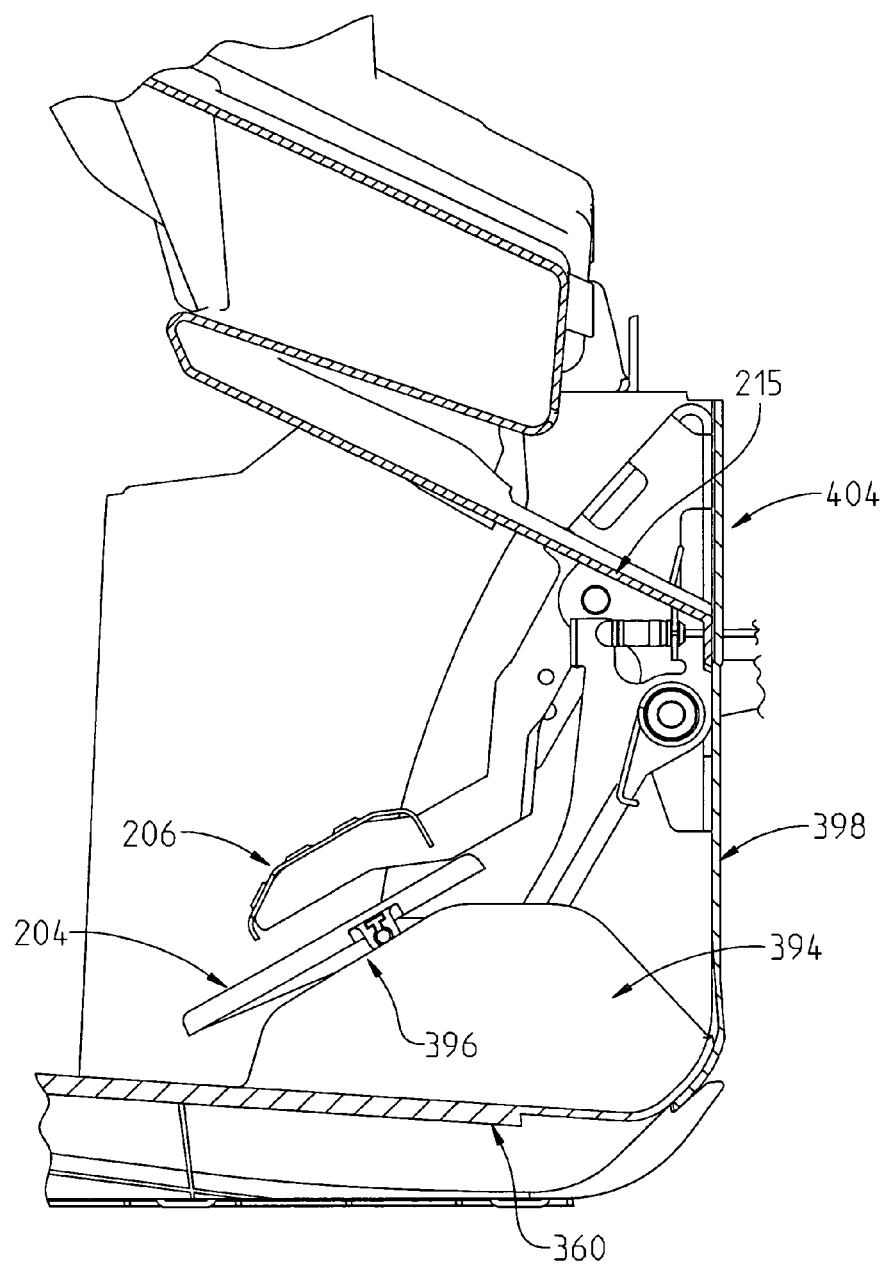
FIG. 8 illustrates a cross-section of the floor body panel, a front lower body panel, and an under dash body panel and the placement of the guard member of FIG. 7.
Figure 9:
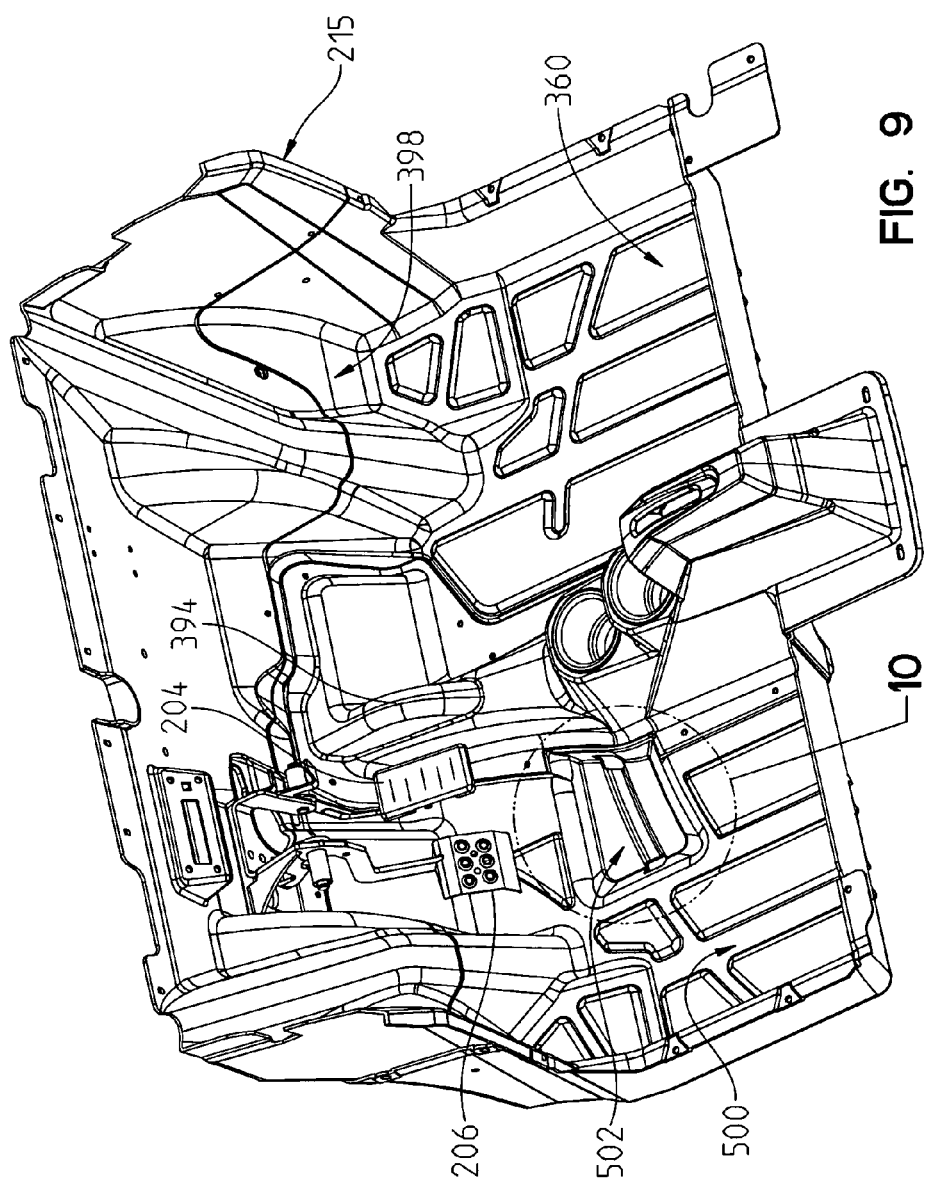
FIG. 9 illustrates a perspective view of the floor body panel of FIGS. 6 and 7.

As shown in FIGS. 8 and 9, a front body panel 398 is shown coupled to floor body panel 360, and an upper portion 404 of front body panel 398 overlaps dash body member 215. As such, dash body member 215, floor body panel 360, and front body panel 398 cooperate to close off operator area 174.

Referring to FIG. 7, floor body panel 360 is shown with the locations of pedal 204 and pedal 206. Floor body panel 360 further includes a guard member 394. Guard member 394 is positioned to prevent the foot of a passenger from entering vehicle operator position 192 and inadvertently depressing pedal 204. In the illustrated embodiment, guard member 394 does not extend across to seat body panel 366, but is rather localized in the area corresponding to pedal 204.

Figure 10:
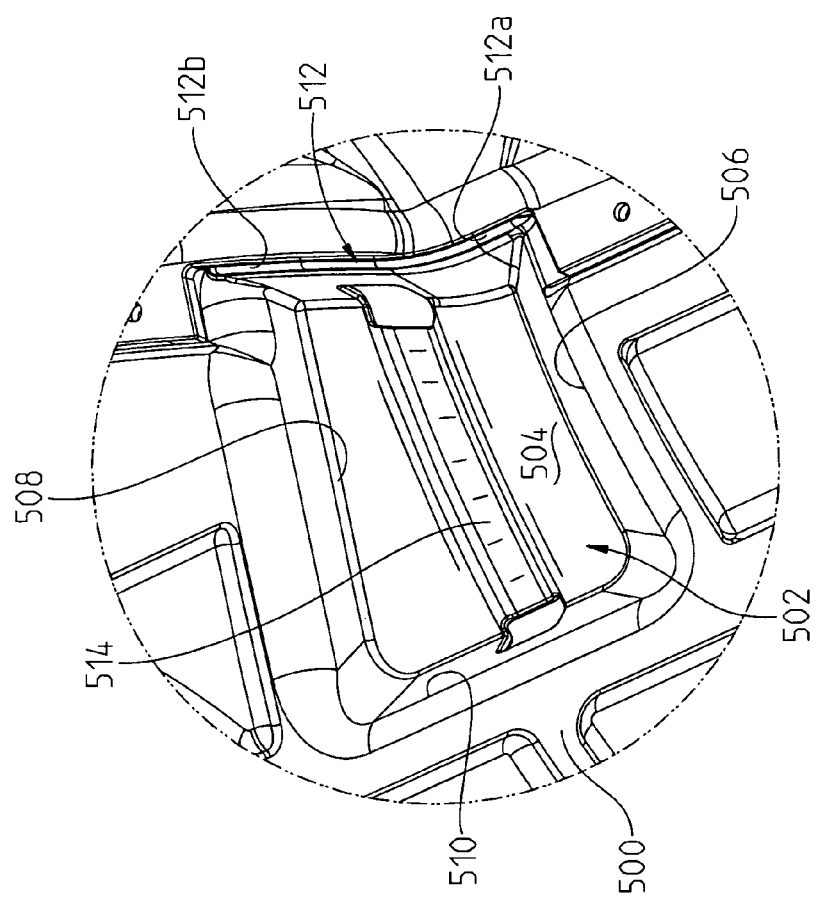
FIG. 10 illustrates an enlarged perspective view of the floor body panel portion depicted in FIG. 9.

With reference now to FIGS. 9 and 10 floor body panel 360 includes a driver floor body panel portion 500 having a recess or foot well 502. As shown best in FIG. 10, foot well 502 is comprised of a floor 504, rear wall 506, front wall 508, left side wall 510, and right side wall 512. Right side wall is comprised of straight section 512a and angled section 512b, as described herein. Floor 504 is further comprised of a groove 514 which is angled rearwardly from right to left (as viewed in FIG. 10), and which laterally overlaps at least a portion of both foot pedals 206 and 208 (FIG. 9).

Figure 11:
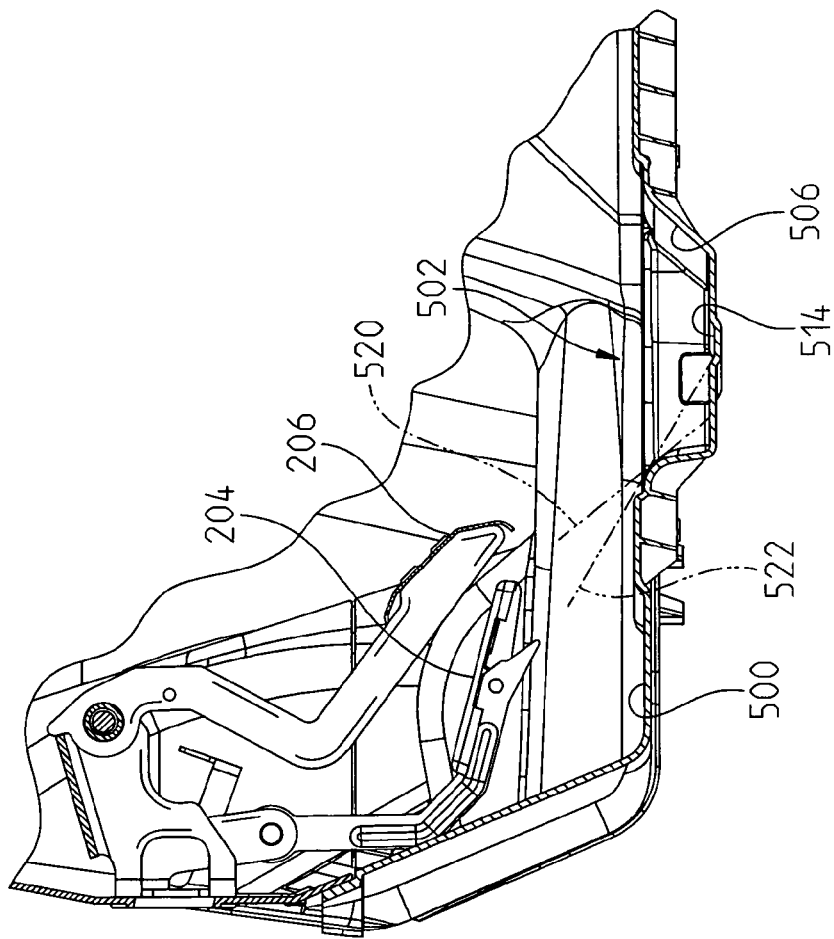
FIG. 11 illustrates a cross-sectional view through the floor body panel as shown in FIG. 10.

In use, a driver may place his or her heel in the foot well 502, either against the floor 504 or in the groove 514. In either event, this creates plural points of contact with the driver's foot, either along line 520 or line 522 (FIG. 11), or along a multiple of other imaginary lines, depending on the particular resting position of the driver's heel. The driver can also rest his or her right hand side foot edge against angled section 512b, for guiding and aligning the foot with the accelerator foot pedal 206. Also, the driver may place the end edge of the foot into the groove 514, and the groove can form a sliding guide when the foot is moved from the accelerator foot pedal 206 to the brake foot pedal 208. As the groove is angled rearwardly, the driver's foot is naturally moved rearwardly to accommodate the location of the brake foot pedal 208.

While this invention has been described as having an exemplary design, the present invention may be further modified within the spirit and scope of this disclosure. For example, rather than being a foot well, the floorboard 500 could include an upstanding projection against which a portion of the driver's heel may engage. This projection may be triangular or pyramidal in shape, or may take on other forms. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle, comprising a vehicle frame having a longitudinal axis, a prime mover attached to the frame, wheels supporting the frame, a floorboard, and a foot control disposed in a raised position above the floor board and being movable in a direction generally parallel to the longitudinal axis, the floorboard having a first generally flat surface with a recess positioned rearwardly of the foot control, and defining a second generally flat surface lower than the first surface, a plurality of contact points rearward of the foot control defining an operating position for an operator's foot in operating proximity of the foot control, the plurality of contact points comprising a first point, a second point, and a third point where the second point is higher than, and forward of, either of the first or third point, and where either the first or third point is profiled to contact the heel of the operator's foot, and the first and third points being spaced from each other along the longitudinal axis to provide alternate contact points for the driver's heel, with one of the first and third points positioned on the second generally planar surface, wherein a first foot position is defined by the first and second points in contact with the operator's foot, and a second foot position is defined by the second and third points in contact with the operator's foot, when in the operating position with the foot control.

2. The vehicle of claim 1, wherein the recess further comprises at least one side edge.

3. The vehicle of claim 2, wherein the recess is generally rectangular.

4. The vehicle of claim 1, further comprising a plurality of foot control members.

5. The vehicle of claim 4, wherein the plurality of contact points are defined by at least one undulation in or on the floorboard.

6. The vehicle of claim 5, wherein the at least one undulation is defined by a recess in the floorboard, the recess extending laterally to provide an overlapping relationship with at least a portion of the plurality of foot control members, and the recess further extending longitudinally.

7. The vehicle of claim 6, wherein the plurality of foot control members comprises an accelerator and a brake pedal.

8. The vehicle of claim 7, wherein the recess is defined by a generally flat bottom portion and at least one side edge.

9. The vehicle of claim 8, wherein the recess further comprises a laterally extending groove defining the third point.

10. A vehicle, comprising a vehicle frame, a prime mover attached to the frame, wheels supporting the frame and driven by the prime mover, a floorboard having a generally horizontal top surface, and a foot control disposed in a raised position above the floor board, the floorboard having a recess extending laterally relative to the foot control for receiving the heel of an operator's foot in multiple lateral positions when operating the foot control, the recess positioned rearward of the foot control and being defined by a generally flat bottom portion, the intersection of the top surface and generally flat bottom portion defining a generally rearwardly facing surface, rearward of the foot control.

11. The vehicle of claim 10, wherein the generally flat bottom portion is generally parallel with the top surface and has at least one side edge.

12. The vehicle of claim 11, wherein the at least one side edge is profiled to contact the bottom of the operator's foot when the operator's heel is in the recess.

13. The vehicle of claim 12, wherein the recess is generally rectangular.

14. The vehicle of claim 10, further comprising a plurality of foot control members.

15. The vehicle of claim 14, wherein the recess in the floorboard laterally overlaps at least a portion of the plurality of foot control members.

16. The vehicle of claim 15, wherein the plurality of foot control members comprises an accelerator and a brake pedal.

17. The vehicle of claim 16, wherein the recess is defined by a generally flat bottom portion and at least one side edge.

18. The vehicle of claim 17, wherein the recess further comprises a laterally extending groove formed in the flat bottom portion to define the location of the heel of the operator's foot, when in the recess, and wherein the groove extends into the generally flat bottom portion.

19. The vehicle of claim 18, wherein the groove extends rearwardly as it progresses from a position adjacent a longitudinal centerline, to a laterally outward position.

20. A vehicle, comprising a vehicle frame, a prime mover attached to the frame, wheels supporting the frame and driven by the prime mover, a floorboard, and a plurality of foot controls adjacent the floor board, the floorboard having a recess for receiving the heel of an operator's foot when operating the foot control, and a groove laterally flanking the plurality of foot controls, the laterally extending groove formed in the recess and defining front and rear surfaces positioned rearward of the foot controls and being profiled to define a location for the heel of an operator's foot when operating the plurality of foot controls.

21. The vehicle of claim 20, wherein the recess is defined by a generally flat bottom portion and at least one side edge, and the groove extends into the generally flat bottom portion.

22. The vehicle of claim 21, wherein the recess is generally rectangular and defines a rearwardly facing surface forward of the front surface of the groove, the rearwardly facing surface being rearward of the foot controls.

23. The vehicle of claim 22, wherein the recess in the floorboard laterally overlaps at least a portion of the plurality of foot control members.

24. The vehicle of claim 23, wherein the plurality of foot control members comprises an accelerator and a brake pedal.

25. The vehicle of claim 21, wherein the recess and groove define a plurality of contact points for contacting an operator's foot when operating the foot control.

26. The vehicle of claim 21, wherein the groove is defined in the flat bottom portion of the recess.

27. The vehicle of claim 20, wherein the groove extends rearwardly as it progresses from a position adjacent a longitudinal centerline, to a laterally outward position.

* * * * *